April 8, 1958   F. W. SWAMER   2,830,100
PREPARATION OF 1,1-DIFLUOROETHANE
Filed April 6, 1956
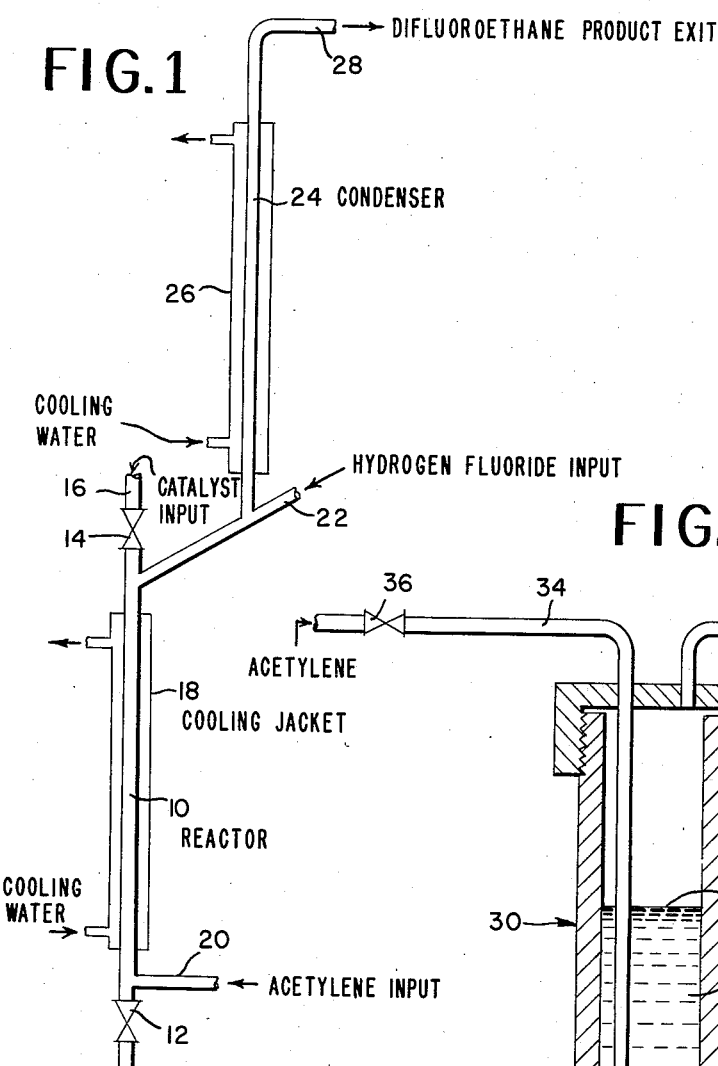
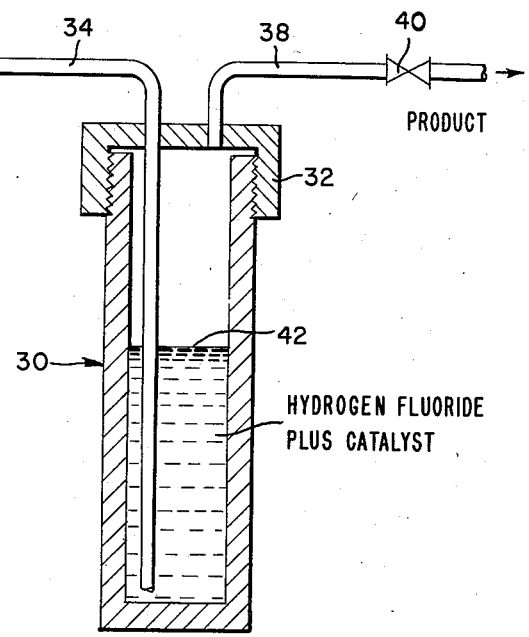
INVENTOR
FREDERIC W. SWAMER
BY
*Edwin C. Woodhouse*
ATTORNEY

United States Patent Office 2,830,100
Patented Apr. 8, 1958

2,830,100

PREPARATION OF 1,1-DIFLUOROETHANE

Frederic W. Swamer, Boothwyn, Pa., assignor to E. I. du Pont de Nemours and Company, Wilmington, Del., a corporation of Delaware Application April 6, 1956, Serial No. 576,572

19 Claims. (Cl. 260—653)

This invention relates to the preparation of 1,1-difluoroethane, and more particularly to an improved process for its preparation by the reaction of hydrogen fluoride with acetylene in the presence of a novel catalyst for the reaction.

It is known that 1,1-difluoroethane is valuable as a refrigerant, as a solvent, and particularly as an intermediate for the production of vinyl fluoride which is known to be a valuable polymerizable material. Vinyl fluoride can be readily prepared by passing 1,1-difluoroethane over a heated catalyst bed, such as aluminum sulfate, to split off HF. When carrying out this dehydrofluorination process, it has been found that as little as 1% of vinyl fluoride in the 1,1-difluoroethane materially shortens the life of the catalyst and thus renders the dehydrofluorination process inefficient.

It has long been known that 1,1-difluoroethane can be prepared by the reaction of acetylene with hydrogen fluoride (HF), usually in the presence of a catalyst. In most cases, vinyl fluoride is simultaneously produced in material proportions, frequently equal to or exceeding the amounts of 1,1-difluoroethane. Such mixtures require costly separation steps in order to obtain the 1,1-difluoroethane sufficiently pure for most purposes, including efficient use in the process for its conversion to vinyl fluoride. Also, such catalysts generally must be employed in large concentrations, have short catalyst lives, require high temperatures and/or pressures, and frequently are quite costly. These features materially increase the cost of the process and of the product.

Burke et al., in Patent No. 2,425,991, have shown that 1,1-difluoroethane can be obtained substantially free of vinyl fluoride by reacting acetylene with liquid HF containing boron trifluoride as the catalyst. However, this process suffers from the disadvantage that the boron trifluoride is quite volatile and, in continuous processes, must be continuously replaced. Also, because of its cost and the large amounts generally used, the boron trifluoride must be recovered for reuse. Thus, the use of boron trifluoride as the catalyst also makes for a generally expensive process.

It is an object of this invention to provide a novel process for producing 1,1-difluoroethane by the reaction of acetylene and hydrogen fluoride. Another object is to provide such a process wherein 1,1-difluoroethane is obtained substantially free of vinyl fluoride. A further object is to provide such a process employing a novel catalyst which is cheap, is effective in small concentrations, and does not require recovery for reuse. A still further object is to provide such a process employing such a catalyst at low or moderate temperatures and pressures. A particular object is to provide a continuous process for the preparation of substantially pure 1,1-difluoroethane from acetylene and liquid hydrogen fluoride. Still another object is to provide an inexpensive process for preparing 1,1-difluoroethane from acetylene and hydrogen fluoride, which process is simple and is readily operated and controlled. Other objects will appear hereinafter.

The above and other objects may be accomplished according to this invention which comprises dissolving an anhydrous metal chloride of the group consisting of titanium tetrachloride and antimony pentachloride in a concentration of from 1% to about 5% by weight in substantially pure liquid hydrogen fluoride (HF), then passing gaseous acetylene free of catalyst poisons into the solution while maintaining the solution at a temperature of from about 0° C. to about 65° C. and at a pressure of from 0 to about 75 p. s. i. gauge sufficient to maintain the HF in the liquid state at the temperature employed.

It has been found that by such process 1,1-difluoroethane is obtained efficiently in excellent yields substantially free of vinyl fluoride and hydrogen fluoride and requires a minimum of after treatment to obtain 1,1-difluoroethane in sufficiently pure form for most purposes. The catalyst is not volatile, is unusually effective in small concentrations, is inexpensive, does not require recovery, has an unique catalyst life of at least 3.5 hours and an exceptional catalyst yield of at least 20 pounds of 1,1-difluoroethane per pound of catalyst. During the reaction process, only insignificant amounts of tars, gums and other unwanted products are found. These factors, together with the low or moderate temperatures and pressures employed, contribute to the economy of the process, resulting in a very inexpensive process and the production of 1,1-difluoroethane at low cost.

The process may be carried out batch-wise or in a continuous manner. The continuous process is much preferred, being more economical and producing the 1,1-difluoroethane in purer state and in higher, quantitative, yields. In the batch process, it is difficult to obtain efficient contact of the acetylene with the liquid HF and with the catalyst, and it is usually necessary to employ excess acetylene which then appears in the product and must be separated therefrom.

Apparatus suitable for carrying out the process of this invention is illustrated diagrammatically in the accompanying drawings in which:

Figure 1 is representative of one type of reaction system suitable for carrying out the reaction in a continuous manner; and Figure 2 is representative of a second but less preferred type of reaction system suitable for carrying out the reaction as a batch or a continuous process.

Referring first to Figure 1, the reactor 10 consists of a vertical tube 30 inches long and ½ inch inside diameter which is made of a material which is inert to the reactants and to the reaction products, such as stainless steel or a solid polymeric material of the character of poly-chlorotrifluoroethylene, polyethylene, and polytetrafluoroethylene. The reactor is closed at the bottom by a drain off valve 12 and at the top by a valve 14 connected with a catalyst input line 16, and is surrounded by a glass cooling jacket 18. An acetylene input line 20, suitably ¼ inch stainless steel tubing, is connected with the lower end of the reactor. A line 22, suitably of stainless steel tubing, leads off from the top of the reactor to the lower end of a stainless steel condenser tube 24 and beyond to form an input line for liquid hydrogen fluoride. The condenser tube is surrounded by a cooling jacket 26 and is connected at the top with a difluoroethane exit line 28.

In operation, the condenser and the reactor tubes are cleaned by rinsing several times with anhydrous hydrogen fluoride. The system is then purged with nitrogen. The metal halide is introduced into the reactor tube and substantially pure, liquid anhydrous hydrogen fluoride is added and dissolves the metal halide. A cooling fluid, usually water, is circulated through the jacket 18 to maintain the solution at the desired temperature. Also, a cooling fluid is circulated through the jacket 26 to maintain the condenser at a temperature to condense any vaporized hydrogen fluoride, but not the 1,1-difluoroethane. The gaseous acetylene is then forced through line 20 and into the solution in the reactor tube at the desired rate where it rapidly reacts with the liquid hydrogen fluoride. The 1,1-difluoroethane is somewhat soluble in the liquid hydrogen fluoride and does not issue from the solution until the solution becomes saturated with it. Since the system is static, any lowering of temperature or condensation of HF at this time causes a slight drop in pressure in the system above the solution. To prevent such drop in pressure, nitrogen or other inert gas is passed into the system with the acetylene through lines 29 during the initial stages, until the liquid HF becomes saturated with 1,1-difluoroethane. Thereafter, the gaseous 1,1-difluoroethane passing out of the liquid HF will prevent the drop in pressure. Therefore, the introduction of the inert gas is then discontinued and only pure gaseous acetylene is passed through line 20. The effluent gases from the reactor tube pass into the condenser where vaporized hydrogen fluoride is condensed and flows back into the reactor tube. The gases flow through the condenser tube and out through line 28 to a vessel (not shown) containing aqueous sodium hydroxide solution where they are scrubbed with such solution to remove any traces of entrained hydrogen fluoride carried over by them. Until the amount of 1,1-difluoroethane produced exceeds the amount that will dissolve in the liquid HF, the gases will be composed almost entirely of nitrogen. Thereafter, the gases will be composed largely of 1,1-difluorethane, the amount of nitrogen therein decreasing rapidly after the flow of nitrogen to the system is discontinued. Substantially, pure liquid hydrogen fluoride is continuously introduced into the reactor tube through line 22 at a rate equal to that at which it is removed from the solution in the reactor tube as by reaction to produce the 1,1-difluoroethane.

Referring more particularly to Figure 2, the reactor vessel 30 is in the form of a bottle having a capacity of about 500 ml. and made of a material which is inert to the reactants and to the reaction products, such as polyethylene, poly-chlorotrifluoroethylene, and polytetrafluoroethylene. The top of the reactor vessel is closed by a stopper or screw cap 32. The cap 32 is provided with a gas inlet tube 34 provided with a valve 36. The tube 34 may terminate at the inside wall of the cap, but, preferably, extends nearly to the bottom of the reactor vessel 30 as shown. The cap 32 is also provided with a gas outlet tube 38 provided with a valve 40 and, preferably, also connected to a reflux condenser similar to that of Figure 1 (not shown in Figure 2). Preferably, the reaction vessel will be set in or surrounded by a bath (not shown) of a cooling liquid, such as cold water, to maintain it at the desired temperature.

In operation, the reactor system is carefully dried and purged with nitrogen. The reactor vessel is partially filled with substantially pure, liquid anhydrous hydrogen fluoride, as to line 42. Conveniently, this is accomplished by forcing anhydrous HF into the vessel cooled to about −78° C. by a bath of Dry Ice and acetone. The metal halide is added and dissolved in the liquid hydrogen fluoride. The reactor and its contents are permitted to come up to the desired temperature of from about 0° C. to about 65° C., preferably near 0° C. Then acetylene is passed through the solution and the exit gases are passed through a condenser, to condense vaporized hydrogen fluoride and return it to the reaction vessel, and then through aqueous sodium hydroxide.

Alternatively, where the acetylene inlet tube 34 does not extend into the solution, the reaction vessel is pressured with acetylene and the solution is agitated as by stirring or by rocking or shaking the reaction vessel, repressuring with acetylene if necessary, until absorption of the acetylene ceases, usually about 3 hours. Then, the contents of the reaction vessel are removed and the 1,1-difluoroethane is separated from the gases by known methods. In this procedure, it is preferable to use an excess of acetylene to maintain the desired pressure. The excess acetylene is readily separated from the product by conventional distillation techniques.

It is essential that the anhydrous metal chloride of this invention be added to the liquid HF before the acetylene is passed into it. The addition of the anhydrous metal chloride to the liquid HF while the acetylene is being passed into or through the liquid HF, fails to produce the desired results. When the metal chloride dissolves in the liquid HF, part of the chlorine is replaced by fluorine, apparently, to produce complex mixtures of metal chloride, metal fluoride, and metal chlorofluorides, the exact composition of the active catalyst being unknown. The metal chloride may be added to the HF which is to be fed into the reactor.

The amount of the metal chloride added to the liquid HF should be such as to provide a concentration of from 1.0% to about 5% by weight based on the liquid HF. These small amounts of metal chloride make for an efficient and inexpensive process. Larger concentrations of metal chloride, materially above 5%, although operable, are undesirable because of economic considerations.

Water, sulfur dioxide and acetone are catalyst poisons for the catalysts of this invention. If significant amounts of these catalyst poisons are present, larger amounts of catalyst will be required to use them up before the catalyst can function and, if they are present in relatively large amounts as in a poor quality crude HF, even large amounts of catalyst are ineffective. Therefore, it is essential that the metal chloride be anhydrous and that the acetylene be free of water and acetone. Acetylene is frequently dissolved in acetone for storage, but is readily freed therefrom by fractionation, scrubbing with aqueous bisulfite, and drying. Neither the metal chloride nor the acetylene ordinarily contain sulfur dioxide. However, crude hydrogen fluoride frequently contains significant amounts of both water and sulfur dioxide. Accordingly, the hydrogen fluoride used in this process must be substantially pure, that is, it must contain less than 0.01% by weight of water and less than 0.1% by weight of sulfur dioxide. Hydrogen fluoride of the required purity can be readily obtained by distilling commercial hydrogen fluoride.

If desired, the gaseous acetylene may be diluted with an inert gas, such as nitrogen, helium, neon, argon, and the like, which has a boiling point materially different from that of the 1,1-difluoroethane so that it can be readily separated therefrom, as by distillation. Usually, such inert gas is not preferred, except in the initial stages of the continuous process where the equipment design is such that a pressure drop is undesirable, i. e., where the pressure drop would tend to cause a caustic scrubbing liquid or other undesirable material to be sucked back into the reactor.

The hydrogen fluoride in the reactor should be in the liquid state. Therefore, the temperatures and pressures will be adjusted accordingly. The temperature in the reactor should be maintained from about 0° C. to about 65° C. Materially lower and higher temperatures render the process less economical due to the costs of refrigeration and heating, respectively. Normally, the temperature will be below 30° C., and preferably will be between 0° C. and 20° C.

The pressure in the reactor will vary with the temperature and must be sufficient to maintain the hydrogen fluoride in the liquid state at the temperature employed. Hydrogen fluoride has a vapor pressure substantially equal to atmospheric pressure at 20° C., of 14 p. s. i. gauge at 40° C., and of 45 p. s. i. gauge at 65° C. and the pressure in the reactor must equal to at least those pressures at the respective temperatures. Usually, the pressures will be in the range of 0 p. s. i. gauge (atmospheric pressure) to about 75 p. s. i. gauge. Preferably, operating at between 0° C. and 20° C., the pressure will be about atmospheric pressure. The process can, if desired, be carried out at pressures materially above the vapor pressure of the hydrogen fluoride at the temperature employed. In such cases, it is preferred to employ pressures of from about 10 to about 75 p. s. i. gauge above the respective vapor pressure, but not in excess of 100 p. s. i. gauge.

The time of contact of the acetylene with the solution of the catalyst in the liquid HF is not critical and may be varied widely, but is primarily a function of the method employed for dispersing the gaseous acetylene in the solution. For example, in a continuous process where immediate intimate contact is ensured, the contact time may be 1 second or less. On the other hand, in a batch process where there is less efficient contact, the contact time may extend to 3 or 4 hours and is governed by considerations of economy. Excess contact time is not harmful because the 1,1-difluoroethane is not affected by the catalyst, the hydrogen fluoride or the acetylene under the reaction conditions of this invention.

In order to more clearly illustrate this invention, preferred modes of carrying it into effect, and the advantageous results to be obtained thereby, the following examples are given wherein the parts are by weight except where specifically stated otherwise:

Example 1

The apparatus of Figure 1 was used in which the reactor tube was constructed of polychlorotrifluoroethylene.

The reactor and condenser were carefully cleaned by rinsing several times with anhydrous hydrogen fluoride. Then 2.6 parts of anhydrous titanium tetrachloride was placed in the reactor tube and 74 parts of substantially pure liquid hydrogen fluoride added. (This represents a catalyst concentration of 3.5% on the weight of HF taken.) Water at 12 to 15° C. was pumped through the outer jacket to maintain the liquid HF at this temperature. The system was purged with nitrogen. Pure gaseous acetylene was then introduced to the solution of catalyst in liquid hydrogen fluoride at a rate of about 40 cc. per minute, while maintaining the system at substantially atmospheric pressure and replacing the liquid HF as it was consumed in the reaction. The effluent product gases were passed through the condenser and then scrubbed with a sodium hydroxide solution. During the 4 hour operation period, effluent gas samples were intermittently analyzed. The product was found by analyses to be substantially pure 1,1-difluoroethane which contained neither acetylene, HF, nor vinyl fluoride, the first samples containing the nitrogen that was left in the system from the purging. A yield of 100% 1,1-difluoroethane based on the acetylene feed was obtained.

When carried out at 0° C., essentially the same results were obtained.

Example 2

Example 1 was repeated, using titanium tetrachloride in varying amounts in several runs (increments of about 0.1 weight percent on the basis of the HF taken) and observation made to see if the reaction proceeded. It was found that, at a titanium tetrachloride concentration of 1.0% by weight of the HF taken, the reaction proceeds satisfactorily.

Example 3

Example 1 was repeated with a titanium tetrachloride concentration of 1.7%. It was found that the catalyst life was 3.5 hours and a catalyst yield of 20 pounds of 1,1-difluoroethane per pound of titanium tetrachloride was obtained.

Example 4

Example 1 was repeated, using antimony pentachloride at a concentration of 1.5% (based on the weight of hydrogen fluoride). Results, essentially the same as those of Example 1 were obtained.

Example 5

Apparatus, corresponding to that of Figure 2, was used in which the bottle 30 was constructed of polyethylene and the gas inlet tube 34 reached nearly to the bottom of the bottle.

The bottle was carefully dried and purged with nitrogen. Then about 100 ml. of substantially pure HF was condensed into the bottle and about 0.5 ml. of anhydrous titanium tetrachloride was added. Pure gaseous acetylene was passed through the solution at a rate of 50 cc. of gas per minute and at about 10° C. The exit gases from the bottle were passed through a reflux condenser, scrubbed with a 4% aqueous solution of sodium hydroxide, and then dried. Two gas samples so obtained had the following percent composition:

| Component | Sample No. 1 | Sample No. 2 |
|---|---|---|
| 1,1-difluoroethane | 13.2 | 14.2 |
| vinyl fluoride | 0.7 | 0.7 |
| acetylene | 77.2 | 79.6 |
| nitrogen | 8.9 | 5.5 |

The following examples are given for purposes of comparison:

Example 6

Example 1 was repeated, except that the reactor tube 10 was constructed of polyethylene and 0.1 part of anhydrous ferric chloride was used in place of the metal chloride of Example 1. Four gas samples taken showed the following analysis (by infrared):

| Component | Sample No. 1 | Sample No. 2 | Sample No. 3 | Sample No. 4 |
|---|---|---|---|---|
| 1,1-difluoroethane | 0.3 | 0.2 | 0.1 | 0.3 |
| vinyl fluoride |  | 0.2 | 0.7 | 0.7 |
| acetylene | 0.2 | 34.0 | 90.5 | 97.7 |
| nitrogen | 99.5 | 65.6 | 3.7 | 1.3 |

Example 7

Example 6 was repeated, with 0.1 part of anhydrous aluminum chloride instead of the ferric chloride. The gas samples analyzed as follows:

| Component | Sample No. 1 | Sample No. 2 | Sample No. 3 | Sample No. 4 |
|---|---|---|---|---|
| 1,1-difluoroethane | 0.2 | 0.7 | 0.7 | 0.6 |
| vinyl fluoride | 0.4 | 1.7 | 1.6 | 1.6 |
| acetylene | 6.2 | 91.3 | 97.2 | 97.5 |
| nitrogen | 93.6 | 6.3 | 0.5 | 0.3 |

Example 8

Example 6 was repeated, using 0.1 part of antimony trifluoride in place of the ferric chloride. Three gas samples were taken. They showed the following analysis:

| Component | Sample No. 1 | Sample No. 2 | Sample No. 3 |
|---|---|---|---|
| 1,1-difluoroethane | 0.4 | 0.7 | 0.7 |
| vinyl fluoride | 1.2 | 1.3 | 1.2 |
| acetylene | 91.8 | 97.6 | 97.8 |
| nitrogen | 6.6 | 0.4 | 0.3 |

The above Examples, 6 to 8 inclusive, show that other metal chlorides and fluorides are not equivalent of the metal chloride of this invention and do not produce like results in the process of this invention. The other metal chlorides and fluorides produce far lower conversions and yields of 1,1-difluoroethane and the 1,1-difluoroethane constitutes a minor proportion of the products and is mixed with large proportions of vinyl fluoride and acetylene from which it must be separated in order to be useful for most purposes. Thus, the other metal chlorides and fluorides are far less efficient and render the process quite expensive.

It will be understood that the apparatus disclosed herein and in the drawings are merely illustrative of the types of apparatus that can be used in practicing the invention, and that they can be widely modified and varied. Also, other types of apparatus, suitable for carrying out the process in a continuous, semi-continuous, and batch-wise manner, will be apparent to those skilled in the art. Furthermore, it will be understood that the examples of this invention, hereinbefore described, are given for illustrative purposes solely, and that many modifications can be made therein within the scope of the general disclosure, such as in the concentration of the catalyst, the temperatures and pressures, and the techniques employed, without departing from the spirit or scope of this invention.

From the preceding description, it will be apparent that this invention provides a novel process for producing 1,1-difluoroethane, employing a novel advantageous catalyst under novel and advantageous conditions, whereby the 1,1-difluoroethane is produced in unusually high yields and in a high state of purity. The catalyst is cheap, highly efficient, has a long catalyst life and a high catalyst yield, and is not volatile under the conditions of use. The process is simple, efficient, easy to operate and control, and exceptionally economical. Therefore, it is apparent that this invention constitutes a valuable advance in and contribution to the art.

The embodiments of the invention in which an exclusive property or privilege is claimed are defined as follows:

I claim:

1. The process for making 1,1-difluoroethane which comprises dissolving a member of the group consisting of anhydrous titanium tetrachloride and anhydrous antimony pentachloride in a concentration of from 1% to about 5% by weight in substantially pure liquid HF, and then passing gaseous acetylene free of catalyst poisons into the solution while maintaining the solution at a temperature of from about 0° C. to about 65° C. and under a pressure of from 0 to about 75 p. s. i. gauge sufficient to maintain the HF in the liquid state at the temperature employed.

2. The process for making 1,1-difluoroethane which comprises dissolving a member of the group consisting of anhydrous titanium tetrachloride and anhydrous antimony pentachloride in a concentration of from 1% to about 5% by weight in substantially pure liquid HF, and then passing gaseous acetylene free of catalyst poisons into the solution while maintaining the solution at a temperature of from about 0° C. to about 65° C. and under a pressure of from about 10 to about 75 p. s. i. gauge above the vapor pressure of the HF at the temperature employed but less than 100 p. s. i. gauge.

3. The process for making 1,1-difluoroethane which comprises dissolving a member of the group consisting of anhydrous titanium tetrachloride and anhydrous antimony pentachloride in a concentration of from 1% to about 5% by weight in substantially pure liquid HF, and then passing gaseous acetylene free of catalyst poisons into the solution while maintaining the solution at a temperature of from about 0° C. to about 30° C. and under a pressure of from 0 to about 75 p. s. i. gauge sufficient to maintain the HF in the liquid state at the temperature employed.

4. The process for making 1,1-difluoroethane which comprises dissolving a member of the group consisting of anhydrous titanium tetrachloride and anhydrous antimony pentachloride in a concentration of from 1% to about 5% by weight in substantially pure liquid HF, and then passing gaseous acetylene free of catalyst poisons into the solution while maintaining the solution at a temperature between about 0° C. and 20° C. and at about atmospheric pressure.

5. The process for making 1,1-difluoroethane which comprises dissolving a member of the group consisting of anhydrous titanium tetrachloride and anhydrous antimony pentachloride in a concentration of from about 1.5% to about 3.5% by weight in substantially pure liquid HF, and then passing gaseous acetylene free of catalyst poisons into the solution while maintaining the solution at a temperature of from about 0° C. to about 65° C. and under a pressure of from 0 to about 75 p. s. i. gauge sufficient to maintain the HF in the liquid state at the temperature employed.

6. The process for making 1,1-difluoroethane which comprises dissolving a member of the group consisting of anhydrous titanium tetrachloride and anhydrous antimony pentachloride in a concentration of from about 1.5% to about 3.5% by weight in substantially pure liquid HF, and then passing gaseous acetylene free of catalyst poisons into the solution while maintaining the solution at a temperature of from about 0° C. to about 30° C. and under a pressure of from 0 to about 75 p. s. i. gauge sufficient to maintain the HF in the liquid state at the temperature employed.

7. The process for making 1,1-difluoroethane which comprises dissolving a member of the group consisting of anhydrous titanium tetrachloride and anhydrous antimony pentachloride in a concentration of from about 1.5% to about 3.5% by weight in substantially pure liquid HF, and then passing gaseous acetylene free of catalyst poisons into the solution while maintaining the solution at a temperature between about 0° C. and 20° C. and at about atmospheric pressure.

8. The process for making 1,1-difluoroethane which comprises dissolving anhydrous titanium tetrachloride in a concentration of from 1% to about 5% by weight in substantially pure liquid HF, and then passing gaseous acetylene free of catalyst poisons into the solution while maintaining the solution at a temperature of from about 0° C. to about 65° C. and under a pressure of from 0 to about 75 p. s. i. gauge sufficient to maintain the HF in the liquid state at the temperature employed.

9. The process for making 1,1-difluoroethane which comprises dissolving anhydrous titanium tetrachloride in a concentration of from 1% to about 5% by weight in substantially pure liquid HF, and then passing gaseous acetylene free of catalyst poisons into the solution while maintaining the solution at a temperature between about 0° C. and 20° C. and at about atmospheric pressure.

10. The process for making 1,1-difluoroethane which comprises dissolving anhydrous antimony pentachloride in a concentration of from 1% to about 5% by weight in substantially pure liquid HF, and then passing gaseous acetylene free of catalyst poisons into the solution while maintaining the solution at a temperature of from about 0° C. to about 65° C. and under a pressure of from 0 to about 75 p. s. i. gauge sufficient to maintain the HF in the liquid state at the temperature employed.

11. The process for making 1,1-difluoroethane which comprises dissolving anhydrous antimony pentachloride in a concentration of from 1% to about 5% by weight in substantially pure liquid HF, and then passing gaseous acetylene free of catalyst poisons into the solution while maintaining the solution at a temperature between about 0° C. and 20° C. and at about atmospheric pressure.

12. The continuous process for making 1,1-difluoroethane which comprises maintaining in a reaction zone a body of a liquid solution obtained by dissolving in a concentration of from 1% to about 5% by weight a member of the group consisting of anhydrous titanium tetrachloride and anhydrous antimony pentachloride in substantially pure liquid HF, continuously passing gaseous acetylene free of catalyst poisons into said solution while maintaining the solution at a temperature of from about 0° C. to about 65° C. and under a pressure of from 0 to about 75 p. s. i. gauge sufficient to maintain the HF in the liquid state at the temperature employed, and continuously adding to said solution substantially pure liquid HF at a rate equal to that at which it is removed from the solution by reaction with the acetylene.

13. The continuous process for making 1,1-difluoroethane which comprises maintaining in a reaction zone a body of a liquid solution obtained by dissolving in a concentration of from 1% to about 5% by weight a member of the group consisting of anhydrous titanium tetrachloride and anhydrous antimony pentachloride in substantially pure liquid HF, continuously passing gaseous acetylene free of catalyst poisons into said solution while maintaining the solution at a temperature of from about 0° C. to about 30° C. and under a pressure of from 0 to about 75 p. s. i. gauge sufficient to maintain the HF in the liquid state at the temperature employed, and continuously adding to said solution substantially pure liquid HF at a rate equal to that at which it is removed from the solution by reaction with the acetylene.

14. The continuous process for making 1,1-difluoroethane which comprises maintaining in a recation zone a body of a liquid solution obtained by dissolving in a concentration of from 1% to about 5% by weight a member of the group consisting of anhydrous titanium tetrachloride and anhydrous antimony pentachloride in substantially pure liquid HF, continuously passing gaseous acetylene free of catalyst poisons into said solution while maintaining the solution at a temperature between 0° C. and 20° C. and at about atmospheric pressure, and continuously adding to said solution substantially pure liquid HF at a rate equal to that at which it is removed from the solution by reaction with the acetylene.

15. The continuous proces for making 1,1-difluoroethane which comprises maintaining in a reaction zone a body of a liquid solution obtained by dissolving in a concentration of from about 1.5% to about 3.5% by weight a member of the group consisting of anhydrous titanium tetrachloride and anhydrous antimony pentachloride in substantially pure liquid HF, continuously passing gaseous acetylene free of catalyst poisons into said solution while maintaining the solution at a temperature between 0° C. and 20° C. and at about atmospheric pressure, and continuously adding to said solution substantially pure liquid HF at a rate equal to that at which it is removed from the solution by reaction with the acetylene.

16. The continuous process for making 1,1-difluoroethane which comprises maintaining in a reaction zone a body of a liquid solution obtained by dissolving in a concentration of from 1% to about 5% by weight anhydrous titanium tetrachloride in substantially pure liquid HF, continuously passing gaseous acetylene free of catalyst poisons into said solution while maintaining the solution at a temperature of from about 0° C. to about 65° C. and under a pressure of from 0 to about 75 p. s. i. gauge sufficient to maintain the HF in the liquid state at the temperature employed, and continuously adding to said solution substantially pure liquid HF at a rate equal to that at which it is removed from the solution by reaction with the acetylene.

17. The continuous process for making 1,1-difluoroethane which comprises maintaining in a reaction zone a body of a liquid solution obtained by dissolving in a concentration of from 1% to about 5% by weight anhydrous titanium tetrachloride in substantially pure liquid HF, continuously passing gaseous acetylene free of catalyst poisons into said solution while maintaining the solution at a temperature between 0° C. and 20° C. and at about atmospheric pressure, and continuously adding to said solution substantially pure liquid HF at a rate equal to that at which it is removed from the solution by reaction with the acetylene.

18. The continuous process for making 1,1-difluoroethane which comprises maintaining in a reaction zone a body of a liquid solution obtained by dissolving in a concentration of from 1% to about 5% by weight anhydrous antimony pentachloride in substantially pure liquid HF, continuously passing gaseous acetylene free of catalyst poisons into said solution while maintaining the solution at a temperature of from about 0° C. to about 65° C. and under a pressure of from 0 to about 75 p. s. i. gauge sufficient to maintain the HF in the liquid state at the temperature employed, and continuously adding to said solution substantially pure liquid HF at a rate equal to that at which it is removed from the solution by reaction with acetylene.

19. The continuous process for making 1,1-difluoroethane which comprises maintaining in a reaction zone a body of a liquid solution obtained by dissolving in a concentration of from 1% to about 5% by weight anhydrous antimony pentachloride in substantially pure liquid HF, continuously passing gaseous acetylene free of catalyst poisons into said solution while maintaining the solution at a temperature between 0° C. and 20° C. and at about atmospheric pressure, and continuously adding to said solution substantially pure liquid HF at a rate equal to that at which it is removed from the solution by reaction with the acetylene.

References Cited in the file of this patent

UNITED STATES PATENTS

| | | |
|---|---|---|
| 2,118,901 | Soll | May 31, 1938 |
| 2,439,299 | Hovey et al. | Apr. 6, 1948 |
| 2,522,687 | Padgitt et al. | Sept. 19, 1950 |
| 2,549,988 | Perkins | Apr. 24, 1951 |